United States Patent [19]

Accumanno et al.

[11] Patent Number: 4,688,860
[45] Date of Patent: Aug. 25, 1987

[54] TRUCK AND HOLDER FOR TAPE CARTRIDGES

[75] Inventors: Mario B. Accumanno, Cedar Grove, N.J.; Laurence G. Ball, Thornton; Macy J. Price, Golden, both of Colo.

[73] Assignee: Engineered Data Products, Inc., Denver, Colo.

[21] Appl. No.: 774,056

[22] Filed: Sep. 9, 1985

[51] Int. Cl.⁴ .............................................. A47F 3/10
[52] U.S. Cl. ................................... 312/125; 211/144; 206/387
[58] Field of Search ..................... 211/41, 42, 40, 163, 211/131, 144; 312/11, 10, 9, 125; 206/387

[56] References Cited

U.S. PATENT DOCUMENTS

| | | | |
|---|---|---|---|
| 3,712,900 | 1/1973 | Fink | 312/10 X |
| 3,713,716 | 1/1973 | Stenger | 312/10 X |
| 3,811,745 | 5/1974 | Cylke | 312/13 |
| 3,862,787 | 1/1975 | Hilsinger | 206/387 X |
| 3,995,921 | 12/1976 | Ackeret | 312/12 |
| 4,239,109 | 12/1980 | Nielsen et al. | 206/387 |
| 4,300,809 | 11/1981 | Brownlee | 312/125 X |

FOREIGN PATENT DOCUMENTS

| | | | |
|---|---|---|---|
| 2236661 | 4/1974 | Fed. Rep. of Germany | 312/13 |
| 2433570 | 1/1976 | Fed. Rep. of Germany | 312/13 |
| 2317184 | 2/1977 | France | 312/12 |
| 16718 | of 1903 | United Kingdom | 211/144 |
| 634765 | 3/1950 | United Kingdom | 211/144 |
| 1598439 | 9/1981 | United Kingdom | 211/144 |

OTHER PUBLICATIONS

IBM Technical Disclosure Bulletin, vol. 16, No. 12, May 1974.
IBM Literature, "Accessories for Cartridge System Tape".

Primary Examiner—Carl D. Friedman
Assistant Examiner—Naoko N. Slack
Attorney, Agent, or Firm—Klaas & Law

[57] ABSTRACT

A truck having means for supporting a plurality of tape cartridge holders and used for transferring a plurality of tape cartridges is provided with rotatable means for supporting the tape cartridges holders so that the tape cartridges in the tape cartridge holders are readily accessible to the operator even in relatively narrow aisles.

13 Claims, 10 Drawing Figures

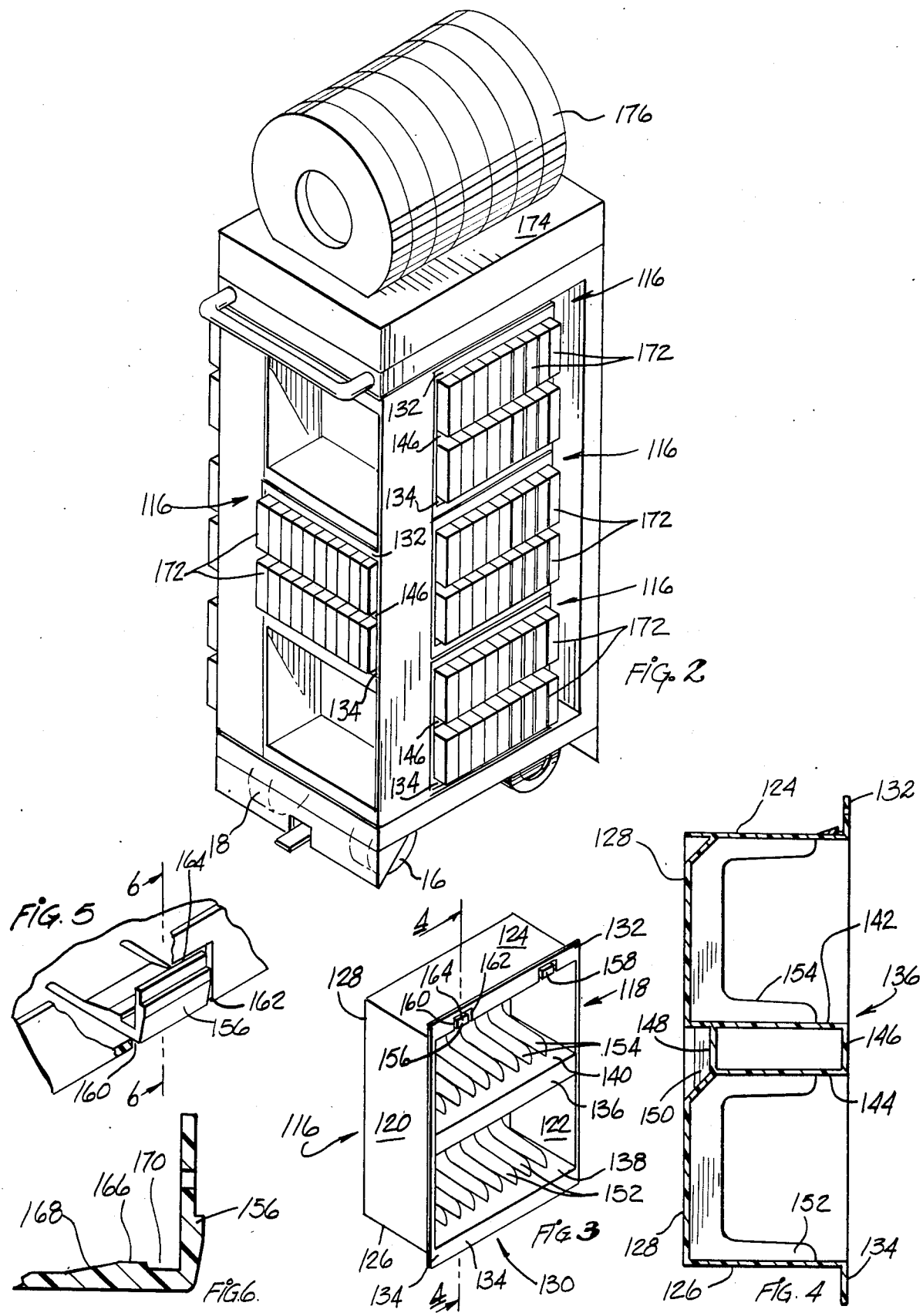

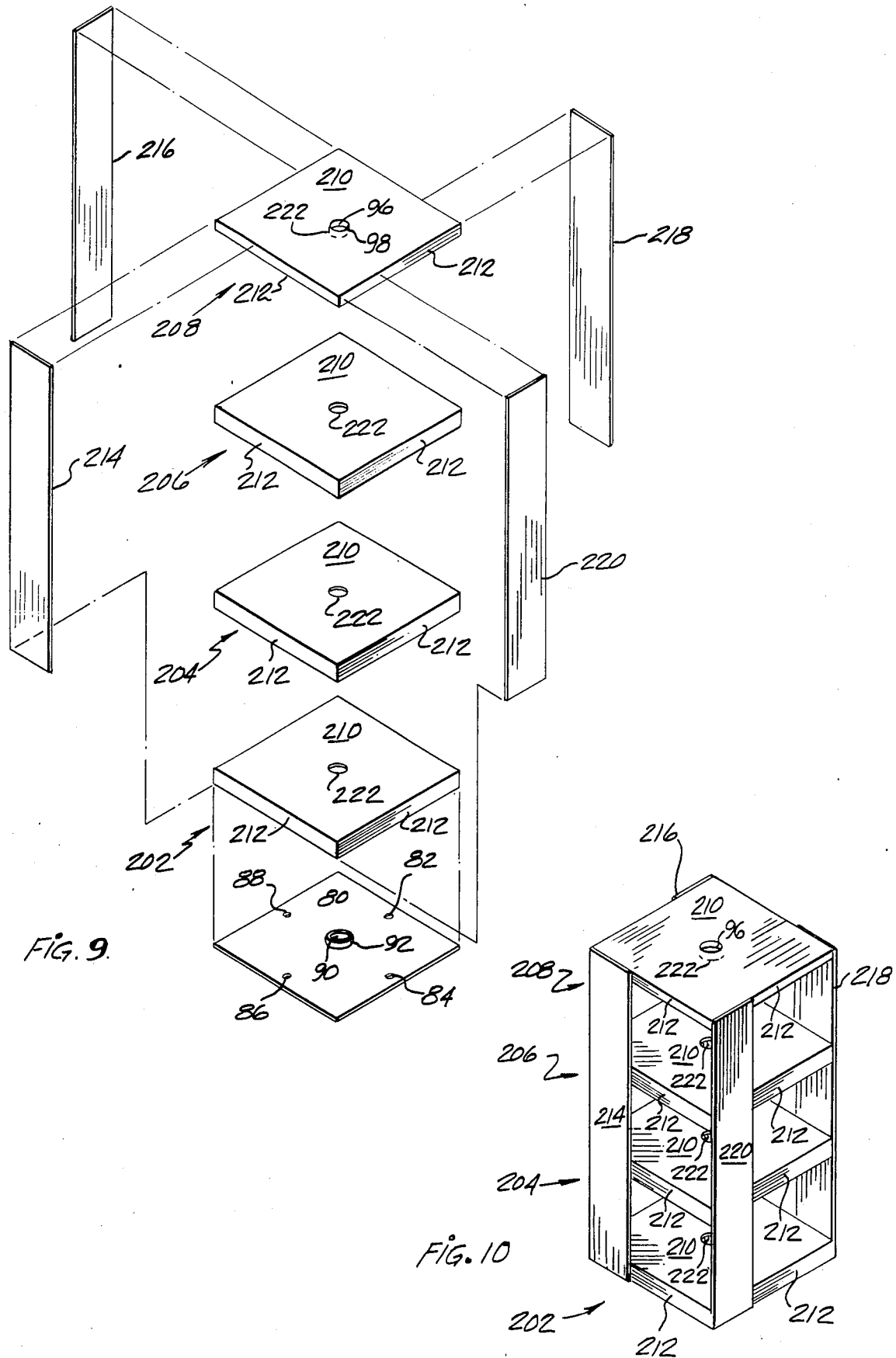

TRUCK AND HOLDER FOR TAPE CARTRIDGES

FIELD OF THE INVENTION

This invention relates generally to a tape cartridge storage system in which a plurality of tape cartridges are stored in suitable means and which tape cartridges are removed when it is desired to use them and then returned to the tape cartridge storage system and more particularly to a truck and a holder having means for temporarily storing a plurality of tape cartridges so that the truck may be readily moved into the tape cartridge storage system to remove or return a plurality of tape cartridges.

BACKGROUND OF THE INVENTION

The use of computers in today's business operations has created two related problems associates with the tape cartridges used with the computers. The first problem relates to a storage system which is readily accessible so that tape cartridges can be removed from or returned to the storage system. There are commercially available trucks which are provided with means for holding a plurality of tape cartridges and which are provided with wheels for easy movement thereof. The trucks may be moved into the tape cartridge storage system, tape cartridges removed from the storage system and transported to the computer for use and then returned to the tape cartridge storage system. With the ever increasing cost of floor space, it is necessary and desirable that the aisle space in a tape cartridge storage system be kept to a minimum. This has resulted in limiting the size of the trucks used in transporting the tape cartridges and also in limiting the number of tape cartridges that can be loaded onto the truck.

BRIEF DESCRIPTION OF THE INVENTION

This invention provides a truck for use in transporting tape cartridges to and from a tape cartridge storage system and areas in which the tape cartridge are used. The truck is provided with means for holding a plurality of tapes which means have four sides in which tape cartridges may be positioned. The holding means are rotatably mounted so that the side from which the tape cartridges are to be returned to or retrieved from the tape cartridge storage system is readily accessible to the operator.

In a preferred embodiment of the invention, the truck comprises a base on the bottom surface of which are secured a plurality of casters with at least one of the casters being swivelly mounted so that the truck can be turned but more preferably two casters are swivelly mounted. The truck has a generally rectangular horizontal cross-sectional configuration having two relatively long sides and two relatively short sides. A support wall is mounted on the base along one of the short sides. A support panel is secured to the upper end of the support wall and extends therefrom in a direction generally parallel to the base. Additional means are provided to maintain the support panel in the parallel position. Means are provided for holding a plurality of tape cartridges and such holding means are located between the support wall and the base. The holding means are provided with four sides into which tape cartridges may be placed and such holding means is rotatably mounted so that one side may be readily accessible to the operator as desired. Means are provided to retain the rotatable holding means in a desired position. A space exists between the holding means and the support wall so that the holding means may be rotated. The capability of being able to utilize four sides for the temporary storage of the tape cartridges allows a maximum number of tapes to be stored on a truck of minimum dimensions.

It is an object of this invention to provide a truck use in transporting a plurality of tape cartridges to and from a tape cartridge storage system and areas in which the tape cartridge are used which truck can hold a maximum number of tape cartridges while having minimum dimensions.

It is another object of this invention to provide a truck for use in transporting a plurality of tape cartridges to and from a tape cartridge storage system and areas in which the tape cartridges are used wherein the truck is provided with means so that the tape cartridges stored thereon are readily accessible to the operator even in narrow aisles.

It is a further object of this invention to provide a tape cartridge holder that is readily transportable and that has means for releasably retaining each of the tape cartridges in the tape cartridge holder.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWING

FIG. 2 is an assembled truck of this invention;

FIG. 3 is a pictorial view of a tape cartridge holder;

FIG. 4 is an enlarged cross-sectional view along the line 4—4 of FIG. 3;

FIG. 5 is a pictorial view of a retaining means;

FIG. 6 is a cross-sectional view along the line 6—6 of FIG. 5;

FIG. 9 is an exploded view of another embodiment of the rotatably mounted means for holding tape cartridges; and FIG. 10 is an assembled view of FIG. 9.

DETAILED DESCRIPTION OF THE INVENTION

Figure 1:
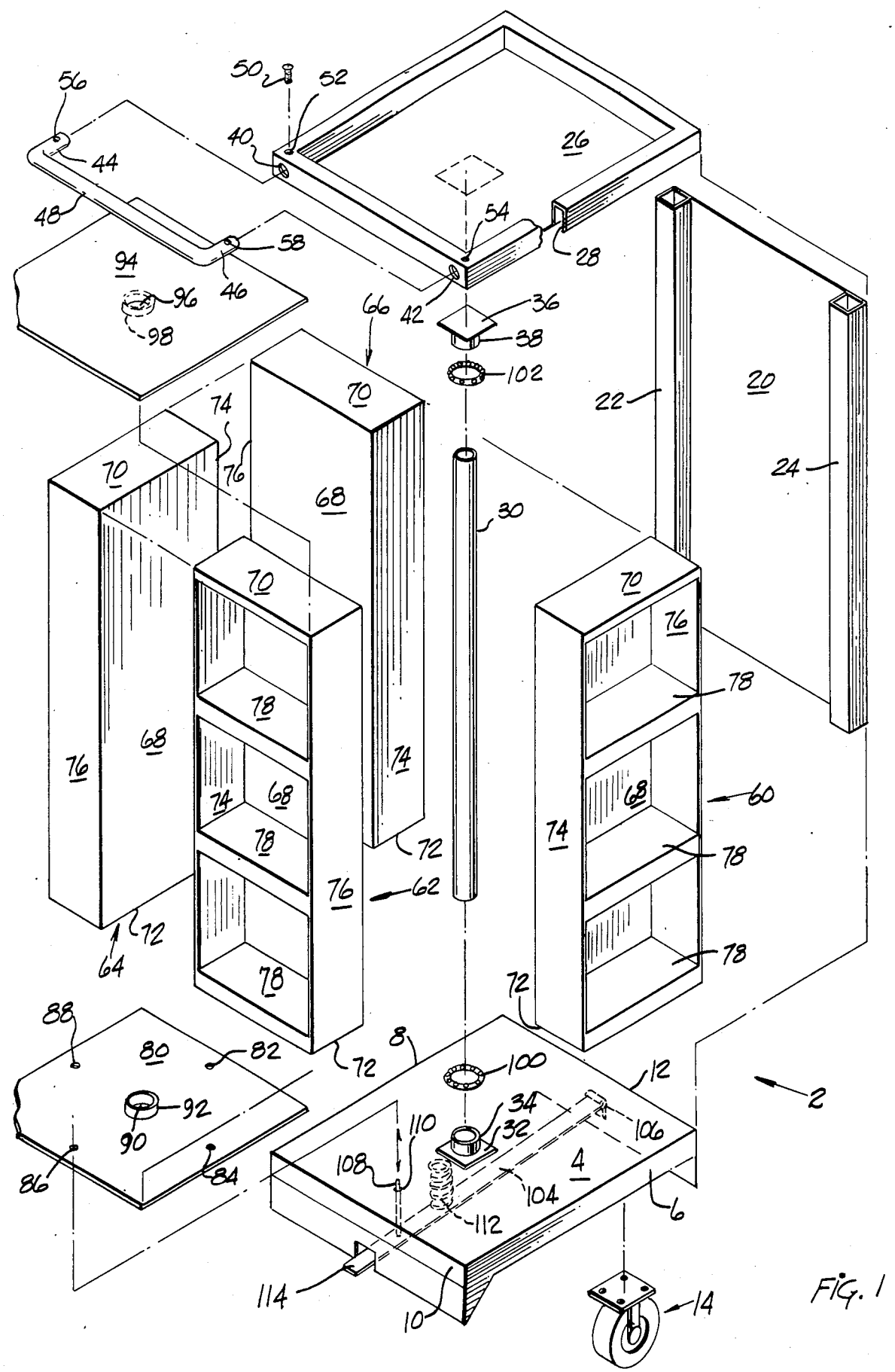
FIG. 1 is an exploded view of various components of a truck and one embodiment of the rotatably mounted means for holding tape cartridges of this invention.

A truck 2 of this invention is illustrated in FIG. 1 and comprises a generally rectangular base 4 having two relatively long sides 6 and 8 and two relatively short sides 10 and 12. A roller 14 is secured on the bottom of the base 4 adjacent to each corner thereof with the casters 16 and 18, illustrated in FIG. 2, being swivelly mounted casters.

A support wall 20 having two reinforcing columns 22 and 24 is secured to the base 4 along the relatively short side 12 by suitable means, such as by welding. A support panel 26 having a border formed by a U-shaped reinforcing channel 28 is secured to the top of the support wall 20. The support panel 26 extends outwardly from the support wall 20 in a direction so that it is generally parallel to the base 4. A cylindrical tube 30 extends between the support panel 26 and the base 4 and helps to support the support panel 26 in the parallel relationship with the base 4. The tube 30 is retained in position by means comprising a base 32 and a cylindrical sleeve 34 secured to the top surface of the base 4 and a base 36 and a cylindrical sleeve 38 secured to the bottom surface of the support panel 26. If desired the end of the cylindrical tube 30 can be secured in the cylindrical sleeve 34 by suitable means such as by welding or by a set screw.

The reinforcing channel 28 is provided with spaced apart openings 40 and 42 adapted to receive the ends 44 and 46 of a handle 48. The handle 48 is secured in position by suitable means such as screws 50 passing through openings 52 and 54 in the reinforcing channel 28 and threadedly secured in openings 56 and 58 in the handle 48.

The means for holding the tape cartridges on the truck 2 in one embodiment of the invention comprises four housings 60, 62, 64 and 66. Each of the housings 60, 62, 64 and 66 comprises a rear wall 68, a top wall 70, a bottom wall 72 and two opposing side walls 74 and 76. A plurality of spaced apart shelves 78 are secured at the end thereof to the adjacent side wall 74 and 76 by suitable means, such as by welding. The top wall 70 and the shelves 78 have a U-shaped cross-sectional configuration with the opening facing downwardly. The housings 60, 62, 64 and 66 are mounted on a plate 80 so that the outer surface of each side wall 74 is in contact with a portion of the outer surface of each rear wall 68. The plate 80 is provided with plurality of spaced apart openings 82, 84, 86 and 88 for purpose to be described below. The plate 80 is provided with a central opening 90 having a reinforcing flange 92. The housings 60, 62, 64 and 66 are secured to the plate 80 by suitable means, such as by welding and are positioned on the plate 80 so that a central passageway extends between the facing portions of the back walls 68. The cross-sectional area of the central passageway is greater than the cross-sectional area of the cylindrical tube 30. A plate 94 having a central opening 96 having a reinforcing flange 98 is secured to each top wall 70 of the housings 60, 62, 64 and 66. A lower bearing means 100 and an upper bearing means 102 are provided for a purpose to be described below.

A truck 2 is assembled by securing the casters 14 to the bottom of the base 4 with the casters 16 and 18 being swivelly mounted. The base 32 and the support wall 20 are secured in position of the base 4. The cylindrical tube 30 is inserted into the cylindrical sleeve 34 and secured therein by welding. The lower bearing means 100, having an inner diameter greater than the outer diameter of the cylindrical tube 30 and the cylindrical sleeve 34, is moved over the cylindrical tube 30 and the cylindrical sleeve 30 so that the lower portion of the bearing means 100 is supported on the base 32. The housings 60, 62, 64 and 66 are secured to the plates 80 and 94 and are positioned around the cylindrical tube 30. The opening 90 in the plate 80 has an inner diameter greater than the outer diameter of the cylindrical tube 30 and the cylindrical sleeve 34 so that the plate 80 can be moved into contact with the supported by the upper portion of the bearing means 100. The upper bearing means 102, having an inner diameter greater than the cylindrical tube 30, is moved over the cylindrical tube 30 until the lower portion of the bearing means 102 is in contact with the supported by the plate 94. The base 36 is secured to the bottom surface of the support panel 26 and the top end of the cylindrical tube 30 is inserted into the cylindrical sleeve 38 and secured thereto by welding or a set screw. The outer diameter of the cylindrical sleeve 38 is less than the inner diameter of the opening 96 and the inner diameter of the bearing means 102 so that the cylindrical sleeve may be moved downwardly until the base 36 is in contact with and supported by the upper portion of the bearing means 102. The support panel is then secured to the top of the support wall 20. The ends 44 and 46 of the handle 48 are inserted through the openings 40 and 42 and secured to the reinforcing channel 28 by the screws 50. In this manner, the assembled housings 60, 62, 64 and 66 are rotatably mounted on the track 2.

Means are provided to retain the assembled housings 60, 62, 64 and 66 from rotating and comprises a lever 104 pivotally mounted on the bottom surface of the base 4 by pivot means 106. A pin 108 is mounted on the lever 104 and is positioned thereon so as to project through an opening 110 in the base 4. A torsion spring 112 is secured to the bottom surface of the base 4 and the top surface of the lever 104 and functions to urge the pin 108 upwardly so that the pin 108 projects upwardly through the opening 110 a distance to ensure that the end of the pin 108 will project into one of the openings 82, 84, 86 or 88 in the plate 80 so as to prevent rotation of the plate 80. When it is desired to rotate the plate 80 and therefore the assembled housings 60, 62, 64 and 66, the end 114 of the lever 104 is depressed so that the end of the pin 108 is removed from its position in one of the openings 82, 84, 86 and 88. After rotation of the assembled housings has been started, the end 114 of the lever is released so that the end of the pin 108 as urged by the spring 112 will automatically enter into the next one of the openings 82, 84, 86 or 88 and stop rotation of the assembled housings 60, 62, 64 and 66.

A tape cartridge storage holder 116 is illustrated in FIG. 3 and comprises a hollow housing 118 having end walls 120 and 122, a top wall 124, a bottom wall 126, a back wall 128 and a front opening 130. An upper flange 132 extends upwardly from the top wall 124 and a bottom flange 134 extends downwardly from the bottom wall 126. A panel 136 extends between the end walls 120 and 122 so as to divide the housing 118 in half and provide a bottom shelf 138 and a top shelf 140 on which tape cartridges may be supported. As illustrated in FIG. 4, the panel 136 has an upper portion 142 and a lower portion 144 joined by two vertically extending supports 146 and 148. A plurality of reinforcing ribs 150 extend between and are connected to the upper portion 138 and the lower portion 140. A plurality of partitions 152 extend upwardly from the bottom shelf 138 and extend continuously along the back wall 128 and extend downwardly from the lower portion 144 of the panel 136. A similar plurality of partitions 154 extend upwardly from the top shelf 140 and extend continuously along the back wall 128 and extend downwardly from the top wall 124. The partitions 152 and 154 effectively form a plurality of individual compartments each of which houses a tape cartridge.

Each tape cartridge holder 116 is provided with means for retaining the tape cartridge holder in position between adjacent shelves, illustrated in FIG. 5. Two spaced apart tabs 156 and 158 are formed in the top wall 124 and the upper flange 132. Each tab 156 and 158 is formed by a pair of spaced apart slots 160 and 162 joined by another slot 164. Each tab 156 and 158 have a projection 166 having an inclined cam surface 168. As the tape cartridge holder 116 is being inserted between adjacent shelves 78, the lower edge of the upper shelf 78 will contact the cam surface 168 and move the tab 156 downwardly. After the tape cartridge holder 116 has been fully inserted into position with the upper flange 132 and the lower flange 134 in contact the facing surfaces of the associated shelves 78, the lower end of the upper shelf 78 will be located in the space 170 formed by the projection 166. In another embodiment (not shown) of the invention, only one centrally mounted tab is used. In FIG. 2, a plurality of tape cartridge holders 116 having a plurality of individual tape cartridges 172 installed therein are illustrated in assembled position on the shelves. It is noted that each tape cartridge 172 extends outwardly beyond the surfaces of the panels 132 and 134 and the support 146 so that the individual tape cartridges 172 may be grasped during insertion and removal. When it is desired to remove the tape cartridge holder 116, the tabs 156 and 158 are depressed to move the projections downwardly and the tape cartridge holder 116 is removed. The upper and lower flanges 132 and 134 also serve as handles so that the tape cartridge holders 116 may be readily transported for use as a scratch tray, staging tray or off-site media container.

As illustrated in FIG. 2, a tray 174 for holding tape cartridge reels 176 has a bottom portion thereof (not shown) seated within the channel 28. If desired, the tray 174 can be shaped to hold tape cartridges.

The various components of the truck 1 are formed from metal such as steel so that they can be readily assembled by welding to form a strong rigid truck. The tape cartridge holders are preferably integrally molded using a high density plastic such as hi impact styrene.

Figure 7:
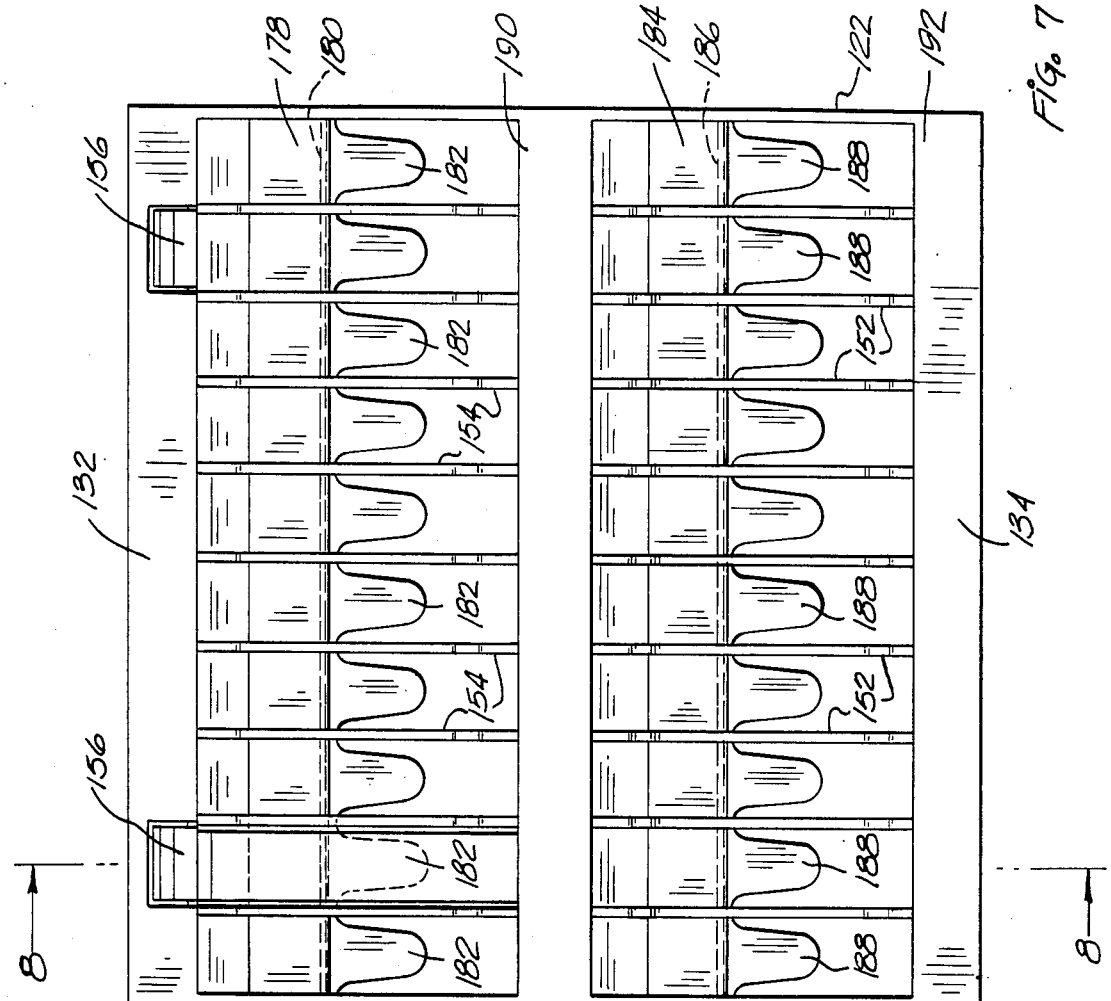
FIG. 7 is a front elevational view of another embodiment of a tape cartridge holder.
Figure 8:
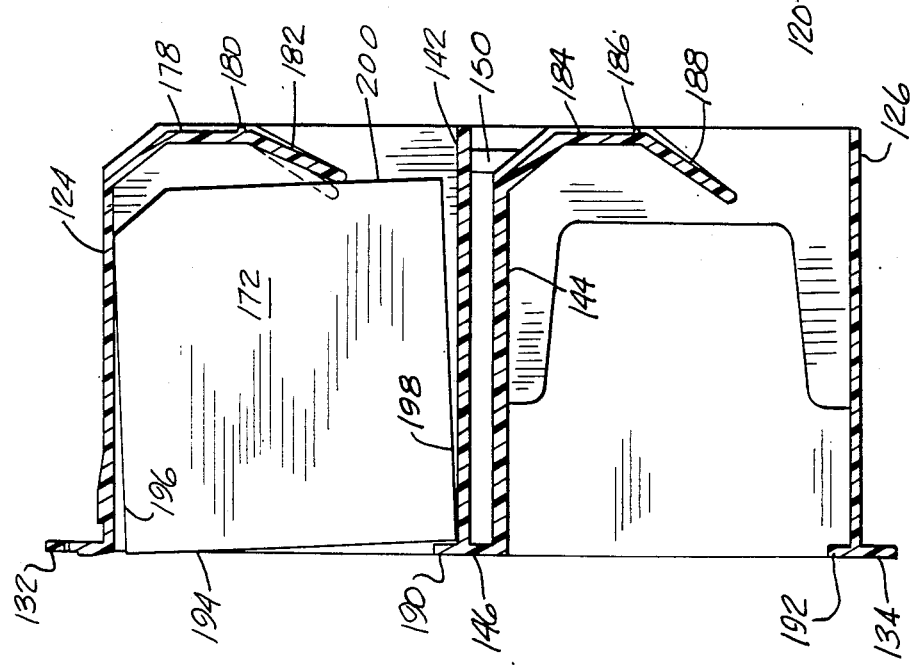
FIG. 8 is a view with parts in section taken along the line 8—8 of FIG. 7.

In the embodiment of the tape cartridge holder 116 illustrated in FIGS. 7 and 8, the portions thereof which correspond to the tape cartridge holder 116 illustrated in FIGS. 3-6 have been identified with the same reference numerals. The tape cartridge holder 116 illustrated in FIGS. 7 and 8 is provided with means for securely retaining each cartridge tape 172 in position in the holder 116. THe securing means comprises a back wall 178 which extends downwardly from the top wall 124 and has a bottom edge 180 spaced substantially above the upper portion 142. A plurality of resilient tabs 182 extend downwardly from the bottom edge 180 and project inwardly into the tape cartridge holder 116 for a purpose described below. Another back wall 184 extends downwardly from the lower portion 144 and has a bottom edge 186 spaced substantially above the bottom wall 126. A plurality of resilient tabs 188 extend downwardly from the bottom edge 186 and project inwardly into the tape cartridge holder 116 for a purpose described below. A tape cartridge retaining rib 190 projects upwardly from the upper portion 142 and extends from end wall 120 to end wall 122. A similar tape cartridge retaining rib 192 projects upwardly from the bottom wall 126 and extends from end wall 120 to end wall 122.

The operation of the securing means is illustrated in FIG. 8. An individual tape cartridge 172 having a front 194, a top 196, a bottom 198 and a back 200 has been inserted into the tape cartridge holder 116. The distance from the top 196 to the bottom 198 of the tape cartridge 172 is less than the distance between the top of the retaining rib 190 to the bottom surface of the top wall 124 so that the individual cartridge tape 172 may pass therebetween. The individual cartridge tape 172 is moved inwardly so that the back 200 contacts and depresses a resilient tab 182. The force exerted by the depressed resilient tab 182 causes the individual cartridge tape 172 to tilt so that a portion of the bottom 198 contacts the surface of the upper portion 142 and a portion of the top 196 contacts the bottom surface of the top wall 124. Also, the force exerted by the depressed rib 182 urges the individual tape cartridge 172 outwardly so that a portion of the front 194 is moved into contact with the retaining rib 190. Thus, the individual cartridge tape 172 is securely retained in the tape cartridge holder 116. When it is desired to remove the individual cartridge tape 172, sufficient pressure is applied to the upper portion of the front 194 adjacent to the top 196 to tilt the individual cartridge tape 172 in the opposite direction so that the bottom 198 is above the retaining rib 190. The force of the depressed rib 182 will then move the individual cartridge tape 172 outwardly so that it may be readily removed from the tape cartridge holder 116.

Another embodiment of the rotatably mounted means for holding tape cartridges is illustrated in FIGS. 9 and 10 and includes the plate 80 and a plurality of shelves 202, 204, 206 and 208 each of which comprises a flat sheet 210 having four flanged side walls 212. The plate 80 is slightly smaller than the shelf 202 so that it fits inside thereof and is welded to the flanged side walls 212. A plurality of panels 214, 216, 218 and 220 are provided and as illustrated in FIG. 10 are welded to the flanged side walls 212 so that the shelves 202, 204, 206 and 208 are spaced apart at equal distance. Each of the shelves has a central opening 222. The assembled unit in FIG. 10 is positioned so that the cylindrical tube 30 passes through the openings 222. The plate 80 is supported on the bearing 100 and is capable of being rotated as described above. The shelves 202, 204, 206 and 208 rotate with the plate 80.

It is contemplated that the inventive concepts herein described may be variously otherwise embodied and it is intended that the appended claims be construed to include alternative embodiments of the invention except insofar as limited by the prior art.

What is claimed is:

1. A mobile cart system for holding a plurality of tape cartridge holders in a plurality of vertical rows spaced about the periphery of the cart comprising:

base means having a polygonal upper support surface with at least four sides and a lower surface having wheel means attached thereto for enabling movement of the cart from place to place;

a plurality of separately constructed individual housing units equal in number to the number of sides of said polygonal upper support surface and being of identical construction including a bottom wall portion, a top wall portion, a back wall portion, a pair of side wall portions, and a plurality of equally vertically spaced shelf portions providing equally sized, laterally outwardly facing openings to receive and support said tape cartridge holders;

upper and lower housing connecting support plate means for fixedly connecting and supporting each of said housing units to one another in side-by-side peripheral abutting relationship to provide a plurality of peripherally spaced outwardly facing side surfaces along at least one of said sides of said polygonal upper support surface and to define a central vertically extending polygonal shape space therebetween;

each of said upper and lower housing connecting support plate means having a central opening;

non-rotatable support shaft means mounted on said polygonal upper support surface and extending through said central vertically extending space between said connected housing units and said central opening of said lower and upper housing connecting support plate means;

a support panel secured to the upper portion of said non-rotatable support shaft means and having an upper and a lower surface;

support panel supporting means mounted on said base means spaced a distance from said housing units and secured to said support panel for supporting said support panel a distance above said base means so that said housing units are located therebetween;

lower bearing means surrounding said non-rotatable support shaft means and located between said lower housing connecting support plate means and said base means; and said lower bearing means permitting equal unitary rotation of all of said housing units relative to said base means and said support panel.

2. A mobile unit as in claim 1 and further comprising:

each of said shelf portions having a U-shaped cross-sectional configuration with the open portion thereof facing downwardly so that the leg portions thereof extend in a downward direction; and a generally planar outwardly facing surface on each of said shelf portions.

3. A mobile unit as in claim 2 and further comprising:

each of said tape cartridge holders having a bottom wall, a top wall, a pair of end walls, a back wall and a front opening;

each of said tape cartridge holders having a top outwardly facing longitudinal edge portion on said top wall portion;

an integral flange extending upwardly from said top outwardly facing longitudinal edge portion and having an outer and inner surface;

said inner surface being generally planar for mating relationship with said generally planar outwardly facing surface of each of said shelf portions; and retaining means for holding each of said tape cartridge holders on each of said shelf portions.

4. A mobile unit as in claim 3 wherein said retaining means comprises:

at least one retaining tab resiliently and pivotally mounted on said top wall portion and having an upper surface thereof facing said top wall portion when said tape cartridge holder is supported on one of said shelf portions;

a longitudinally extending projection extending upwardly from said upper surface of said retaining tab and having an open ended recess formed therein, said recess having spaced apart abutment walls; and a cam surface on said longitudinally extending projection so that as said tape cartridge holder is placed on and inserted into said shelf portion a portion of said leg portion of the next upper shelf portion will contact said cam surface and move said retaining tab downwardly until said open ended recess is reached and said retaining tab resiliently moves upwardly so that said leg portion is between said spaced apart abutment walls to limit movement of said tape cartridge holder.

5. A mobile unit as in claim 4 and further comprising:

at least two spaced apart retaining tabs on said top wall portion.

6. A mobile unit as in claim 1 and further comprising:

upper bearing means surrounding said non-rotatable support shaft means and located between said upper housing connecting support plate means and said support panel.

7. A mobile unit as in claim 6 and further comprising:

partition means secured to at least said end walls of each of said tape cartridge holders for forming a plurality of shelves;

means associated with each of said shelves for forming a plurality of compartments, each compartment having dimensions adapted to receive and hold a tape cartridge;

a plurality of resilient fingers on said back wall adapted to be contacted and depressed by each of said tape cartridges; and a retaining lip extending upwardly from a front edge of each of said shelves adapted to be contacted by each of said tape cartridges and to prevent movement of each of said tape cartridges out of each of said compartments.

8. A mobile unit as in claim 7 and further comprising:

each of said shelf portions having a U-shaped cross-sectional configuration with the open portion thereof facing downwardly so that the leg portions thereof extend in a downward direction; and a generally planar outwardly facing surface on each of said shelf portions.

9. A mobile unit as in claim 8 and further comprising:

each of said tape cartridge holders having a bottom wall, a top wall, a pair of end walls, a back wall and a front opening;

each of said tape cartridge holders having a top outwardly facing longitudinal edge portion on said top wall portion;

an integral flange extending upwardly from said top outwardly facing longitudinal edge portion and having an outer and inner surface;

said inner surface being generally planar for mating relationship with said generally planar outwardly facing surface of each of said shelf portions; and retaining means for holding each of said tape cartridge holders on each of said shelf portions.

10. A mobile unit as in claim 9 wherein said retaining means comprises:

at least one retaining tab resiliently and pivotally mounted on said top wall portion and having an upper surface thereof facing said top wall portion when said tape cartridge holder is supported on one of said shelf portions;

a longitudinally extending projection extending upwardly from said upper surface of said retaining tab and having an open recess formed therein, said open ended recess having spaced apart abutment walls; and a cam surface on said longitudinally extending projection so that as said tape cartridge holder is placed on and inserted into said shelf portion a portion of said leg portion of the next upper shelf portion will contact said cam surface and move said retaining tab downwardly until said open ended recess is reached and said retaining tab resiliently moves upwardly so that said leg portion is between said spaced apart abutment walls to limit movement of said tape cartridge holder.

11. A mobile unit as in claim 10 and further comprising:
   at least two spaced apart retaining tabs on said top wall portion.

12. A mobile unit as in claim 1 and further comprising:
   means for releasably holding said housing units against rotation.

13. A mobile unit as in claim 12 wherein said releasable holding means comprises:
   a lever pivotally mounted on said lower surface of said base means;
   an opening in said base means;
   a plurality of openings in in said lower housing connecting support plate means;
   an upstanding pin mounted on said lever at a location so that said pin can pass through said opening in said base and into one of said openings in said lower housing connecting support plate means so as to retain said lower housing connecting support plate means at a desired location; and
   spring means urging said lever toward said base means to move said pin into one of said openings in said lower housing connecting support plate means.

* * * * *